June 2, 1953　　M. A. CROSBY　　2,640,274
APPARATUS FOR CONTINUOUS GAUGING
Filed Jan. 25, 1947　　3 Sheets-Sheet 1
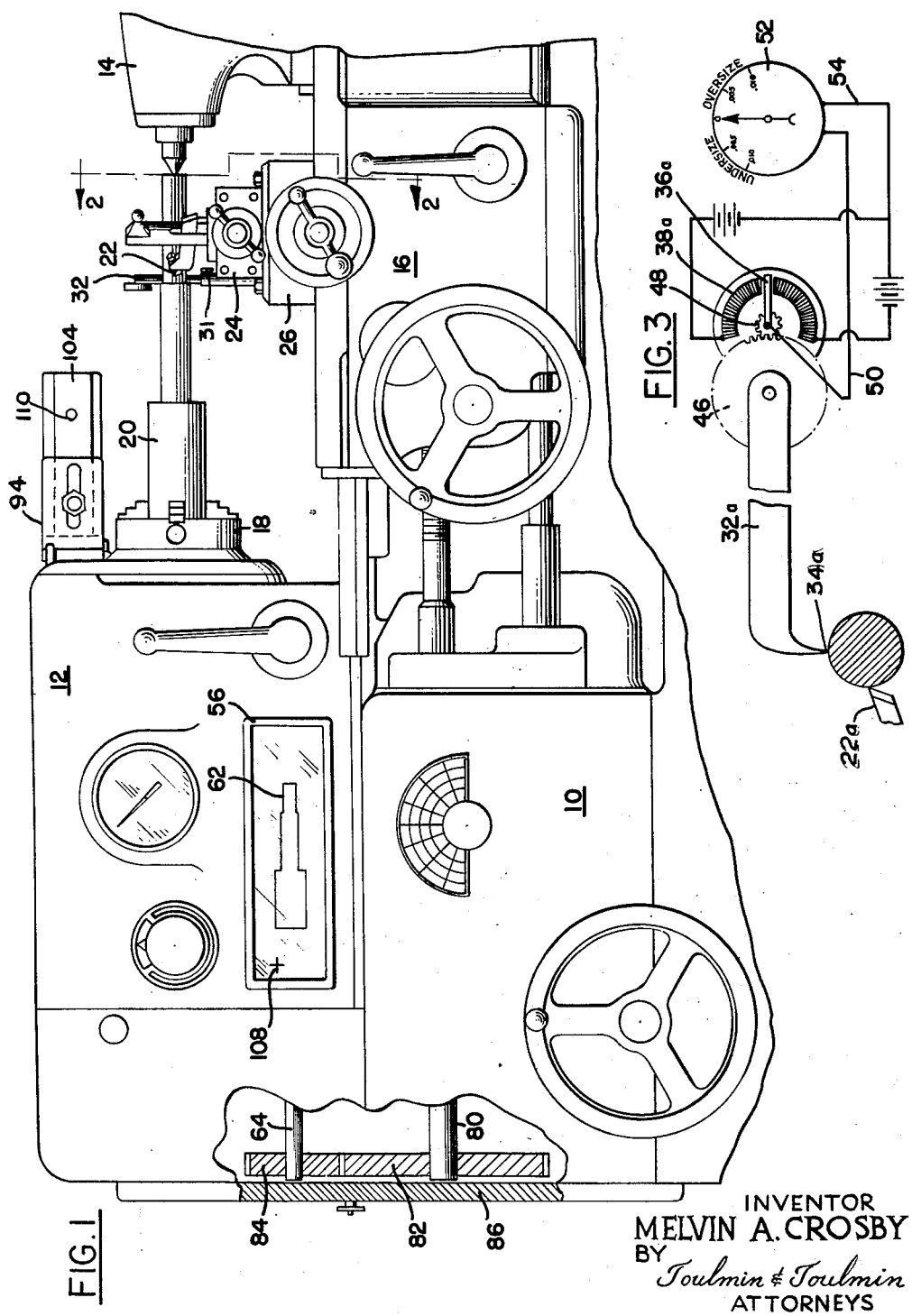
INVENTOR
MELVIN A. CROSBY
BY
Toulmin & Toulmin
ATTORNEYS June 2, 1953 M. A. CROSBY 2,640,274
APPARATUS FOR CONTINUOUS GAUGING
Filed Jan. 25, 1947 3 Sheets-Sheet 2
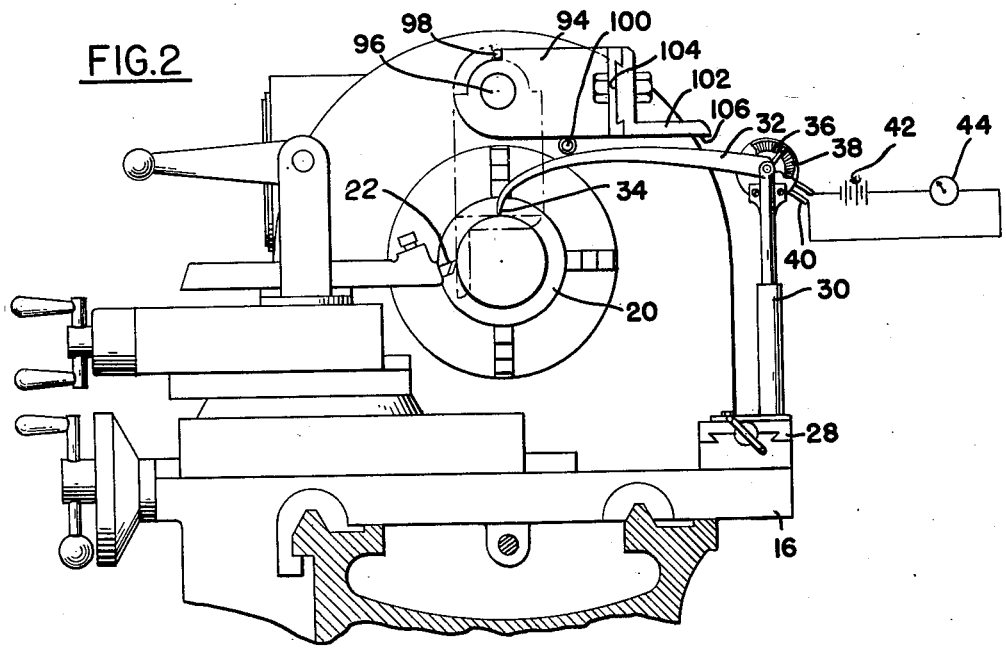
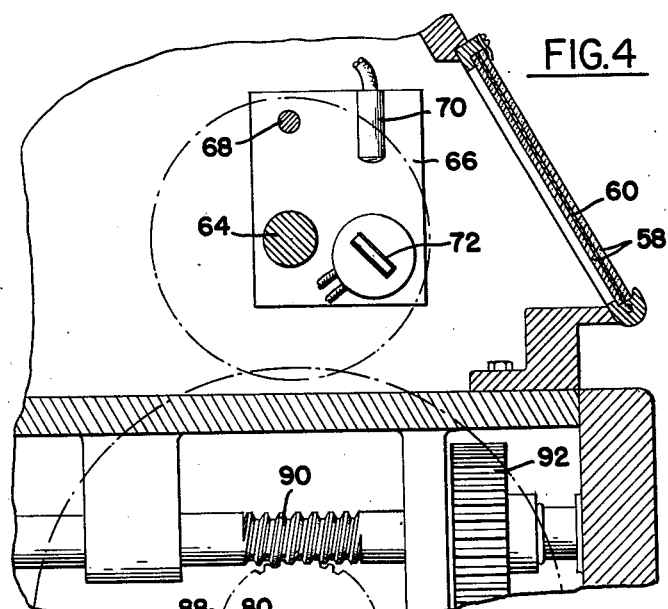
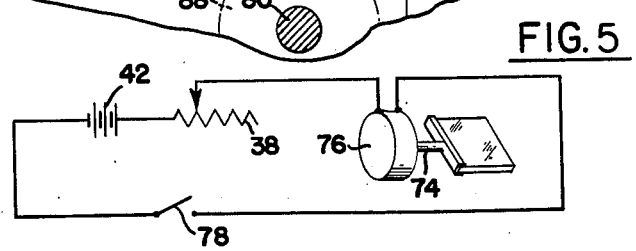
INVENTOR
MELVIN A. CROSBY
BY
Toulmin & Toulmin
ATTORNEYS June 2, 1953     M. A. CROSBY     2,640,274
APPARATUS FOR CONTINUOUS GAUGING
Filed Jan. 25, 1947     3 Sheets-Sheet 3
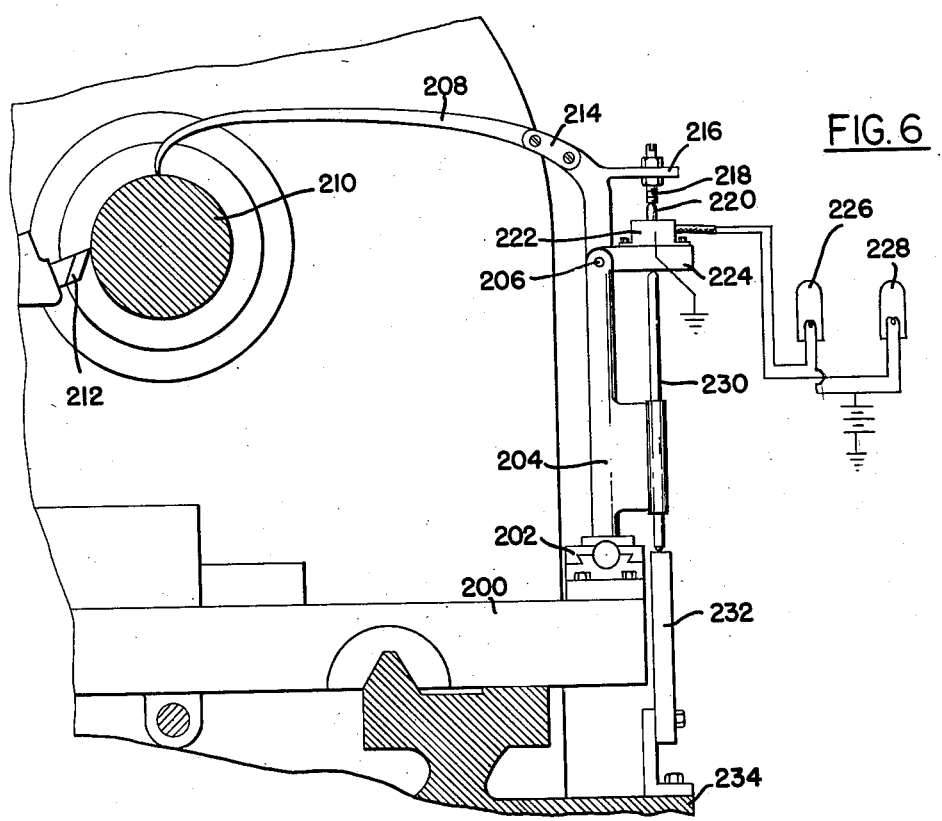
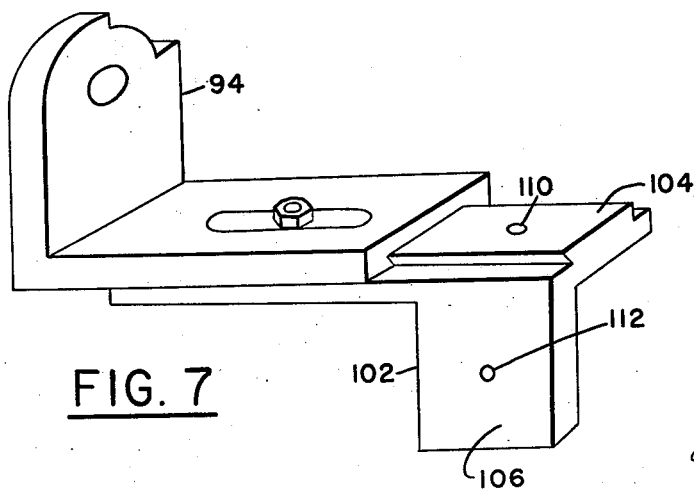
INVENTOR
MELVIN A. CROSBY
BY
Toulmin & Toulmin
ATTORNEYS Patented June 2, 1953

2,640,274

UNITED STATES PATENT OFFICE 2,640,274

APPARATUS FOR CONTINUOUS GAUGING

Melvin A. Crosby, Dayton, Ohio, assignor to The Commonwealth Engineering Company of Ohio, Dayton, Ohio, a corporation of Ohio Application January 25, 1947, Serial No. 724,319

6 Claims. (Cl. 33—181)

This invention relates to machine tools, and in particular to a control or indicating mechanism for machine tools for assisting the operator in the production of workpieces of the correct size.

Heretofore, in connection with machine tools, for an operator to produce a workpiece of a certain configuration it was necessary for him to measure the said workpiece with gauges or micrometers from time to time and to compare his measurements with a blue-print or other standard. Another method employed for producing workpieces of a certain configuration is to have the machine fitted with contouring controls so that the workpieces are formed automatically by the machine in a continuous cycle according to a template or pattern. In the latter case a special machine is required, or auxiliary fittings are required so that the utility of the machine is definitely limited, and the change from one workpiece to another involves considerable setup time and skill.

The particular object of the present invention is to provide means whereby a standard machine such as a lathe can readily be adapted for producing workpieces according to a predetermined configuration, and without the fitting thereto of expensive and extensive auxiliary equipment.

Another object is to provide mechanism in combination with a machine tool such as a lathe by means of which a continuous indication is given of the workpiece size throughout cutting operation.

Still another object of this invention is to provide means in association with a machine tool for producing a record of the machining of the workpiece which can be attached thereto for record and inspection purposes.

It is also an object of the present invention to provide means for adjusting the cutting tool of the machine and the indicating mechanism so that the operator can be certain at all times that the indications given by the indicator are correct.

These and other objects and advantages will become more apparent upon reference to the following description taken in connection with the attached drawings in which:

Figure 1 is a side elevation, partly broken away of a lathe having auxiliary equipment according to this invention;

Figure 2 is a transverse section taken on the line 2—2 of Figure 1 and showing the cutting tool and indicating mechanism gauge;

Figure 3 is a diagrammatic view showing the electrical connections of the indicator mechanism employed in Figures 1 and 2;

Figure 4 is a fragmentary view showing a modified arrangement for the indicating mechanism;

Figure 5 is an electrical diagram of the indicator circuit of Figure 4;

Figure 6 is a view similar to Figure 2 but showing a modified arrangement; and

Figure 7 is a detailed perspective view of the gauging bracket employed in the invention.

General arrangement

According to this invention, there is provided a machine tool having means for supporting a workpiece and a cutting tool for traversing and shaping the workpiece. Arranged to move relative to the work in the same manner as the aforementioned cutting tool does is an indicating mechanism which continuously measures the workpiece and either indicates the size thereof, records the size thereof, or indicates a variation in the workpiece from a predetermined pattern.

When the indicating device indicates the workpiece size, this indication may be compared with a chart or drawing carried on the machine so that the operator has a continuous visual indication of the size of the workpiece being machined. By this he is enabled to make adjustments in the tool setting so that the turned workpiece is of the correct size and shape.

When the indicator makes a record of the workpiece size, the said record forms the visual indication, and the record may be attached to the workpiece after machining as a file record or for inspection purposes.

Another form of the invention utilizes a template or pattern and the workpiece is continuously compared therewith and differences in size of the workpiece and the pattern are either indicated or recorded so that the operator can make the necessary adjustments of the tool.

The invention also contemplates the provision of a gauge on the machine tool frame which can be moved into position to permit the indicating mechanism and the tool to be set thereagainst so that when a new tool is placed in the machine, or when the tool is re-ground, it can be readjusted into its proper position relative to the indicator.

Structural arrangement

Referring to the drawings, Figure 1 shows a machine tool such as a lathe having a bed 10 which mounts a headstock 12 and, a tailstock 14, and a tool supporting carriage 16. The headstock may comprise workpiece holding means such as the chuck 18 so that a workpiece 20 can be driven in rotation relative to the tool 22 which is carried in the compound 24 mounted on the cross-slide 26 of the carriage 16.

According to this invention, and as best seen in Figure 2 the carriage 16 supports a longitudinally adjustable slide 28 on which is mounted the size indicating mechanism more fully described herein below. Thus this mechanism includes a telescoping column arrangement 30, the upper portion of which may be fixed in various positions by the threaded bolt 31. Pivotally supported at the upper end of the upper portion of the column 30 is a feeler arm 32 which engages the workpiece 20 as at 34. The feeler arm 32 is connected with the movable portion 36 of an adjustable rheostat 38 that is connected by the wires 40 with a battery 42 and an indicating electrical instrument 44. Thus vertical movement of the upper portion of column 30 with feeler arm 32 positioned as in Figure 2, results in sliding of the movable portion 36 across rheostat 38 to thereby adjust its resistance. It will be apparent that the indication of the instrument 44 will also be an indication of the position of the arm 32 relative to the supporting column 30 and, therefore, of the diameter of the workpiece 20. Thus, the size of the workpiece which is being turned can at any time be determined by the observation of the instrument 44.

The feeler arm 32 engages the workpiece somewhat to the rear of the cutting tool 22 in order that the said feeler arm will always ride on a surface which has been turned by the cutting tool. As shown in Figure 1, the tool point and feeler lie in the same plane (such plane being one taken transversely of the axis of the workpiece). It is believed clear that were the feeler arm to lead the cutter, i. e. ride on a surface which had not been cut, the utility of the feeler arm would be lost.

A modification of the feeler arm and indicating means is shown in Figure 3. Therein is disclosed an arrangement wherein a feeler arm 32a is connected to drive a gear 46 which in turn runs on a smaller gear 48 that is connected with the movable arm 36a of a rheostat 38a. The rheostat 38a is of a divided type and the arm 36a is connected by a wire 50 with one terminal of an instrument 52, while the ends of the separate resistance portions of the rheostat are each connected with one terminal of separate batteries, the other terminals of which are connected together and to the opposite side of the instrument 52 by a wire 54. The arrangement is such that movement of the feeler arm 32a in either direction will cause an indication on the instrument 52 of the amount of the said movement. Thus, if a cylindrical workpiece is being turned, or a flat surface is being machined, the arrangement shown in Figure 3 will be operable continuously to indicate any deviations from a predetermined workpiece size.

Instead of, or in addition to, the indicating device 44, shown in connection with the arrangements of Figures 1 and 2, the machine is preferably provided with a viewing screen or window as at 56, best seen in Figure 4 which consists of an aperture adapted for receiving a pair of transparent or translucent plane members 58 which receive therebetween a transparent or translucent chart 60 on which is inscribed, drawn, or printed the workpiece outline as indicated at 62 in Figure 1.

Within the headstock 12, there is a threaded spindle or screw 64 which carries a bracket 66 that may be guided in reciprocation as by the guide rod 68. The bracket 66 mounts a light source 70 which preferably comprises a light bulb and a condensing lens system so that a relatively fine pencil of light is thrown on an oscillatable mirror 72 whence the light deflects into the window opening 56 where it makes a trace on the chart 60 that the operator can compare with the workpiece outline 62.

The oscillatable mirror 72 is preferably supported on the shaft 74 of an electrical instrument movement 76 which is connected in series with the rheostat 38 and battery 42 of the circuit shown in Figure 2. Optionally, there may be provided a switch 78 by which the circuit may be interrupted if desired. This circuit is illustrated in Figure 5 of the drawings.

The spindle or screw 64 is driven by an arrangement shown in Figures 1 and 4 wherein it will be seen that the feed rod 80 of the lathe extends into a compartment at the rear of the lathe where it carries a gear 82. The gear 82 meshes with another gear 84 which is connected to drive the spindle or screw 64. A cover 86 may be provided which can be removed in order to change the gears 82 and 84 thereby to change the ratio of speeds of the feed rod 80 and spindle 64, this being necessary when the workpiece is large so that a reduced sized image can be employed on the viewing screen. Conversely, if the workpiece is quite small, then an enlarged image can be placed in the viewing screen and the spindle 64 be connected to run to drive the bracket 66 at a greater speed than that of the carriage 16.

In Figure 4, it will be seen that the feed rod 80 carries a gear 88 which is driven by the worm 90 that, in turn, is driven by a gear 92 from a suitable source of power carried in the machine bed.

It will be apparent that the foregoing arrangement provides for a continuous visual indication of the size of the workpiece being formed in the machine. The operator is enabled to observe at all times whether or not the workpiece is being formed properly. Furthermore, the visual indication is so located on the machine that a supervisor can check the operator's work at any time merely by observing the viewing screen.

In order to insure that the cutting tool and the feeler arm are properly adjusted relative to each other, that the feeler arm does not ride on a surface not yet cut by the cutter, there is preferably mounted on the headstock of the machine a gauge or gauging means comprising a bracket 94 that may be pivoted as at 96 to rotate between the full line position shown in Figure 2 and the dotted line position therein. A stop pin 98 positively stops the bracket in both of its positions of movement and a means such as the spring loaded plunger 100 may be employed for retaining the bracket in its upper position. The bracket includes an angular portion 102 having a pair of surfaces 104 and 106 at right angles to each other. When the bracket is pivoted into its dotted line position, the tool and feeler arm may be adjusted relatively by resting the feeler arm on the surface 104 while bringing the cutting tool into engagement with the surface 106. Preferably, these surfaces include inscribed gauge marks 110, 112 on which the tool and the point of the feeler arm should rest. With the tool and feeler arm in this position, the rheostat 38 in circuit with the battery and instrument movement 76 is adjusted in order to bring the light beam into register with a predetermined gauge point on the viewing screen which is indicated by the crossed lines at 108 in Figure 1. By using cross lines the relative position of the tool and feeler arm in the axial direction of the workpiece can also be adjusted so that at all times there is a predetermined leading of the feeler arm by the tool. This feature is of merit in the event that it is desired to turn tapers so that the chart mounted in the viewing aperture can be modified from the actual contour of the workpiece in order to give a true indication to the operator of the position of the tool relative to the work.

Figure 6 illustrates a further modified arrangement of the feeler arm and indicating means wherein the carriage 200 carries a slide 202 that can be adjusted axially thereon and which supports a column 204. Pivotally connected to the top of the column 204 at 206 is a feeler arm 208 that rides on an upper surface of the workpiece 210 which is being shaped by a cutting tool 212. The arm 208 preferably includes a detachable connection at 214 whereby the arm can be replaced by another of a different configuration or length if desired. The arm 208 also includes a bracket portion 216 which adjustably receives a screw 218 which is positioned to abut the actuating plunger 220 of a double pole-double throw limit switch 222 rigidly supported on a block 224 which is pivoted about the pivot 206.

The limit switch 222 has in circuit therewith the high and low limit warning lights 226 and 228 respectively. The block 224 is adapted for being moved about the pivot 206 by a rod 230 which rides on a template 232 stationarily supported on the machine bed 234. The template 232 is shaped to correspond with the shape of the workpiece being formed and, when the said workpiece is being properly shaped there is no relative movement between the limit switch 222 and the arm 208 as the carriage 200 traverses the workpiece 210. However, if the workpiece is not being shaped in accordance with the template 232, then the limit switch 222 is actuated to limit either the high limit warning light 226 or the low limit warning light 228. This gives an immediate indication to the operator that the position of the tool 212 is to be adjusted.

It will be understood that the arrangements shown in Figure 6 could be employed in conjunction with the arrangement shown in Figures 1 through 5 if desired, or that the tool 212 could be automatically actuated properly to contour the workpiece according to any of several well known automatic arrangements. In any event, the arrangement shown in Figure 6 will give an immediate indication whenever the workpiece is not being formed to size.

It will be apparent from the foregoing that the present invention provides means for continuously gauging a workpiece which is being formed in a machine tool, and of continuously indicating or recording, or both indicating and recording the exact size of the workpiece for the benefit of the machine operator or supervisor.

It will be understood that this invention is susceptible to modification in order to adopt it to different usages and conditions and, accordingly, it is desired to comprehend such modifications within this invention as may fall within the scope of the appended claims.

I claim:

1. In a workpiece size indicating device for a machine tool having a tool supporting carriage, a stationary workpiece supporting means having a rotational axis for a workpiece, and a movable workpiece cutting means; support means on said carriage horizontally and vertically slidable relative thereto, a feeler arm pivotally mounted on said support means, said cutting means being horizontally and vertically adjustable relative to the carriage, and means for positioning said cutting means and said feeler arm along said axis in a predetermined relation relative to each other, said positioning means comprising a gauging means pivotally mounted on said stationary workpiece supporting means and being movable into engagement with said arm and cutting means.

2. In a machine tool having a stationary workpiece supporting means having a workpiece rotational axis, a movable workpiece cutting means and a tool supporting carriage: a size indicating mechanism comprising a feeler arm, means for mounting said feeler arm for movement with said cutting means in the cutting direction thereof and for movement in a direction at right angles to the said cutting direction, and means for setting said feeler arm and cutting means in a predetermined relationship along said axis comprising a gauging means pivotally mounted on said stationary supporting means and being movable into engagement with said cutting means and feeler arm.

3. In a machine tool having a tool supporting carriage, a stationary workpiece supporting means having a workpiece rotational axis, and a movable workpiece cutting means; a size indicating mechanism and means for supporting said mechanism on said carriage, said last-mentioned supporting means including a vertical telescoping column horizontally and vertically adjustable relative to said carriage and movable with said cutting means, said size indicating mechanism including a feeler arm pivotally mounted on said column, a rheostat fixedly secured to said column, a contacting arm rigidly mounted on said feeler arm for sliding movement along said rheostat when said feeler arm is pivoted in a vertical plane, and means for fixing the relative positions of said cutting means and said feeler arm along said axis comprising a gauging means pivotally mounted on said stationary supporting means and movable into engagement with said cutting means and said feeler arm, an electrical indicating device, means for connecting said rheostat and indicating device in an electrical circuit with a source of power, and means for adjusting said indicating device to a predetermined position when said cutting means and feeler arm are in said relative positions.

4. In a machine tool having a tool supporting carriage, a stationary workpiece supporting means having an axis for rotation of a workpiece and a movable workpiece cutting means; a size indicating mechanism and means for supporting said mechanism on said carriage, said last-mentioned supporting means including a column adjustable relative to said carriage and movable with said cutting means, said size indicating mechanism including a feeler arm pivotally mounted on said column, means for positioning said cutting means and said feeler arm in a predetermined relation along said axis comprising a gauging means pivotally mounted on said stationary supporting means and movable into engagement with said cutting means and feeler arm, means connected to said feeler arm for indicating the position of said arm as it is moved in a vertical plane and means for adjusting said indicating means to a predetermined position when said feeler arm and cutting means are in said predetermined relation.

5. In a workpiece size indicating device for a machine tool having a tool supporting carriage, a stationary workpiece supporting means having a rotational axis for a workpiece, and a movable workpiece cutting means: support means on said carriage horizontally and vertically slidable relative thereto, a feeler arm pivotally mounted on said support means, said cutting means being horizontally and vertically adjustable relative to the carriage, and means for positioning said cutting means and said feeler arm along said axis in a predetermined relation relative to each other, said positioning means comprising a gauging means pivotally mounted on said stationary workpiece supporting means and being movable into engagement with said arm and cutting means, said gauging means comprising angulated surfaces having gauge marks thereon providing resting points for said cutting means and feeler arm when in said predetermined relation.

6. In a machine tool having a tool supporting carriage, a stationary workpiece supporting means having an axis for rotation of a workpiece, and a movable workpiece cutting means; a size indicating mechanism and means for supporting said mechanism on said carriage, said last-mentioned supporting means including a column adjustable relative to said carriage and movable with said cutting means, said size indicating mechanism including a feeler arm pivotally mounted on said column, and means for positioning said cutting means and said feeler arm in a predetermined relation along said axis comprising a gauging means pivotally mounted on said stationary supporting means and movable into engagement with said cutting means and feeler arm, means connected to said feeler arm for indicating the position of said arm as it is moved in a vertical plane, and means for adjusting said indicating means to a predetermined position when said feeler arm and cutting means are in said predetermined relation, said gauging means having marks inscribed thereon providing positions of rest for said cutting means and feeler arm during positioning thereof.

MELVIN A. CROSBY.

References Cited in the file of this patent

UNITED STATES PATENTS

| Number | Name | Date |
|---|---|---|
| 496,272 | Miebach | Apr. 25, 1893 |
| 763,011 | Mietaschk | June 21, 1904 |
| 952,588 | Stevens | Mar. 22, 1910 |
| 1,404,545 | Richardson | Jan. 24, 1922 |
| 1,835,807 | Parker | Dec. 8, 1931 |
| 1,949,795 | Geh | Mar. 6, 1934 |
| 1,954,442 | Dall et al. | Apr. 10, 1934 |
| 1,992,027 | Green | Feb. 19, 1935 |
| 2,010,706 | Williams | Aug. 6, 1935 |
| 2,120,771 | Thompson | June 14, 1938 |
| 2,130,710 | Alexander | Sept. 20, 1938 |
| 2,150,070 | Kregecz | Mar. 7, 1939 |
| 2,171,156 | Lawton | Aug. 20, 1939 |
| 2,197,308 | Kolb | Apr. 16, 1940 |
| 2,198,523 | Adams | Apr. 23, 1940 |
| 2,239,811 | Cuppers | Apr. 29, 1941 |
| 2,245,894 | Arms | June 17, 1941 |
| 2,248,446 | Wohlfarth | July 8, 1941 |
| 2,259,472 | Johnson | Oct. 21, 1941 |
| 2,340,987 | Robidoux | Feb. 8, 1944 |
| 2,372,427 | Johnson | Mar. 27, 1945 |
| 2,374,365 | MacNeill et al. | Apr. 24, 1945 |
| 2,398,562 | Russell | Apr. 16, 1946 |
| 2,497,990 | Huber et al. | Feb. 21, 1950 |
| 2,534,632 | Smith | Dec. 19, 1950 |